(No Model.)

L. G. WERNER.
ANIMAL SHEARS.

No. 506,755.  Patented Oct. 17, 1893.

Witnesses:
W. J. Sankey.
R. H. Orwig.

Inventor: Louis G. Werner,
By Thomas G. Orwig, Atty.

UNITED STATES PATENT OFFICE.

LOUIS G. WERNER, OF DES MOINES, IOWA, ASSIGNOR TO JOHN NEWBURN, OF SAME PLACE.

ANIMAL-SHEARS.

SPECIFICATION forming part of Letters Patent No. 506,755, dated October 17, 1893.

Application filed November 17, 1892. Serial No. 452,237. (No model.)

*To all whom it may concern:*

Be it known that I, LOUIS G. WERNER, a citizen of the United States of America, residing at Des Moines, in the county of Polk and State of Iowa, have invented a new and useful Improvement in Clipping-Shears, of which the following is a specification.

My object is to produce a simple, strong and durable clipping shears, adapted to be held and operated by one hand, as required to promote convenience and accuracy in cutting hair.

My invention consists in placing the operating lever directly under the stationary handle so that it may be held and operated by one hand and also in the manner of constructing and connecting the various parts as hereinafter set forth, pointed out in my claims, and illustrated in the accompanying drawings, in which—

Figure 1:
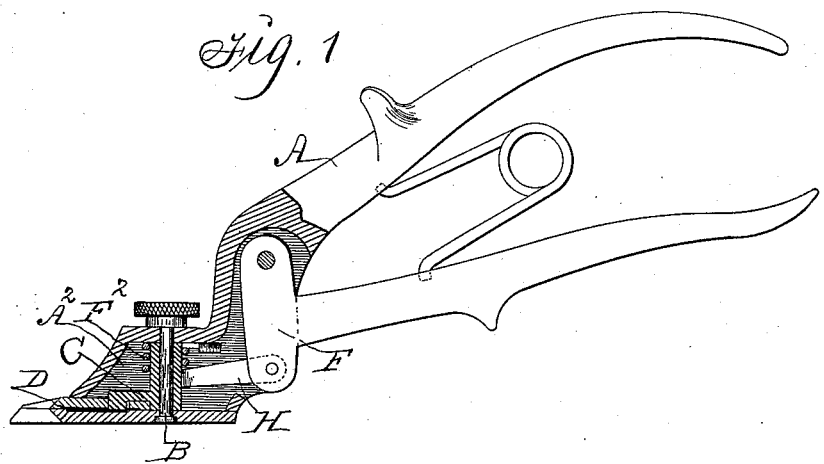
Figure 2:
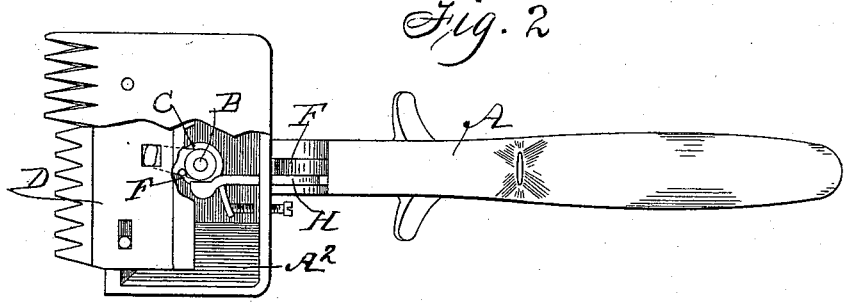
Figure 3:
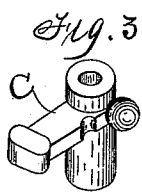
Figure 4:
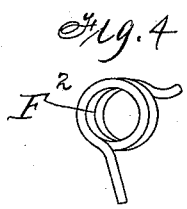
Figure 5:

Figure 1 is a side view of the complete device with parts broken away showing its one end in longitudinal section. Fig. 2 is a bottom view of the same with part of the bottom and plate removed to show the various operative parts. Fig. 3 is a perspective view of a bell crank lever, Fig. 4 of a coil spring and Fig. 5 of a link each of which elements is adapted in shape to be combined within a chamber in the enlarged lower end of the handle.

Referring to the accompanying drawings A represents the stationary handle having its lower end $A^2$ enlarged and adapted to contain the fixed journal B and the bell crank C, pivoted to said journal and to allow the reciprocating cutter plate D to operate therein.

F is a mating handle or lever fulcrumed to the handle A at its lower end portion and adapted to be placed directly beneath the said handle and to be operated toward it. This lever F has a cross head F' at its lower end and each end of the cross head is perforated to admit a pivot. A spring $F^2$ is interposed between the handle A and lever F to normally hold them separated.

To the lower end of the cross head F' is pivoted a link H which is connected at its other end to the bell crank C on the journal B. A projection on the end of the bell crank lever C enters a corresponding opening in the cutter plate D so that when the bell crank lever C is operated by means of the lever F having a cross head F' it will actuate the cutter plate.

Having thus described my invention, what I claim as new, and desire to secure by Letters Patent, is—

1. In a clipping shears the combination of a stationary handle and a movable handle or lever having a cross head at its lower end in vertical alignment with each other, and a rod or link attached to the lower end of the cross head and to mechanism for operating the reciprocating cutter plate of the device, as and for the purposes stated.

2. An improved clipping shears composed of a stationary handle having integral with its lower end an enlargement adapted to contain the reciprocating cutter plate and other operative parts, a movable handle under the stationary one, a spring interposed between them to normally hold them separated a cross head on the lower end of the said movable handle, a bell crank pivoted to a journal in the enlarged end of the handle, a reciprocating cutter plate connected with the said bell crank and with the cross head of the movable handle, and a stationary comb plate attached to the under side of the enlarged end of the handle as and for the purposes stated.

3. In an improved clipping shears, the combination of a handle, the lower end of which is enlarged to admit the operative parts of the device, a movable handle in vertical alignment with the stationary handle, having a cross head formed in its lower end and a link connected thereto and to mechanism for converting the motion of the reciprocating cutter plate of a clipping shears and a spring interposed between the said handle to normally press them apart, substantially as shown and described, to operate in the manner set forth.

LOUIS G. WERNER.

Witnesses:
W. A. FULLENWIDER,
THOMAS G. ORWIG.